J. B. WOODWORTH.
FAUCET.
APPLICATION FILED OCT. 26, 1908.

926,713.

Patented June 29, 1909.

Witnesses:
J. J. Laass
E. Kaiser

Inventor:
John B. Woodworth
By his Attorney
E. Laass

UNITED STATES PATENT OFFICE.

JOHN B. WOODWORTH, OF FAYETTEVILLE, NEW YORK, ASSIGNOR TO ARTHUR H. TURNBULL AND WILLIAM H. SMITH, OF SYRACUSE, NEW YORK.

FAUCET.

No. 926,713.          Specification of Letters Patent.          Patented June 29, 1909.

Application filed October 26, 1908. Serial No. 459,535.

*To all whom it may concern:*

Be it known that I, JOHN B. WOODWORTH, a citizen of the United States, and resident of Fayetteville, in the county of Onondaga, in the State of New York, have invented new and useful Improvements in Faucets, of which the following, taken in connection with the accompanying drawings, is a full, clear, and exact description.

This invention relates to the class of faucets embodying an automatically closing valve provided with a stem which is actuated by a rotatable shaft for opening the valve, and means for operating the shaft.

The main object of the present invention is to produce a faucet of the aforesaid type which shall be simple, strong and durable in construction, and efficient and reliable in its action, and also inexpensive to manufacture.

A further object of the invention is to produce a structure composed of parts which can be easily and quickly assembled, and readily and conveniently disconnected when required for the purpose of repairing or renewing a part.

To that end the invention consists in the novel arrangement and combination of the component parts of the faucet hereinafter fully described and set forth in the claims.

Figure 1:
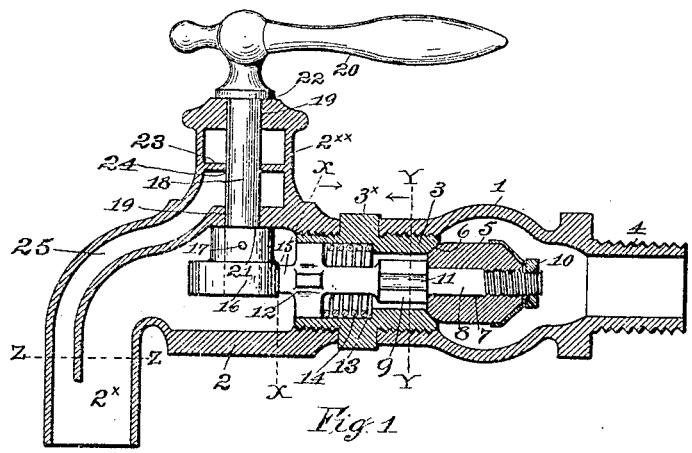
Figure 5:
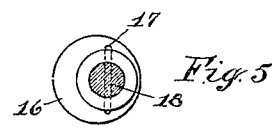
Figures 2, 6:
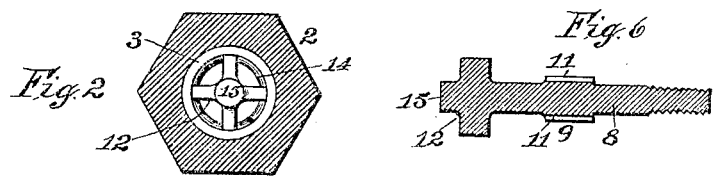
Figures 3, 4, 7:
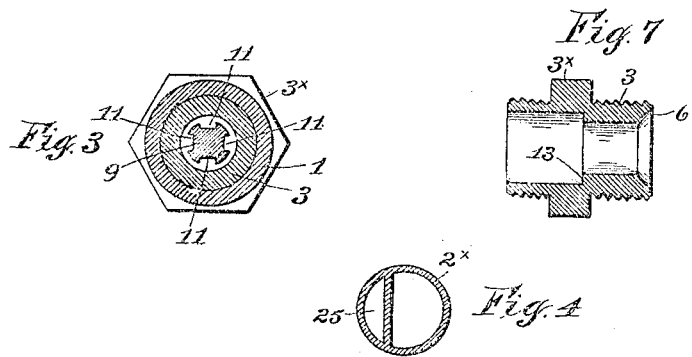

In the accompanying drawings, Figure 1 is a longitudinal sectional view of the faucet constructed in accordance with my improvements; Figs. 2 and 3 are transverse sections on the dotted lines —X—X— and —Y—Y— respectively in Fig. 1; Fig. 4 is a transverse section of the discharge-nozzle, taken on the line —z—z—; Fig. 5 is a detail view of the cam which actuates the valve-stem; Fig. 6 is a detail longitudinal sectional view of the valve-stem; and, Fig. 7 is a detail longitudinal sectional view of the threaded union, which connects the two members of the faucet-body.

Like numerals of reference indicate like parts in the several views in the drawings.

The body of the faucet is composed of an inlet-casing —1— and a hollow head —2— formed with the usual discharge-spout —2$^\times$— and chamber —2$^{\times\times}$—. Each of said parts is provided with an internal screw-thread to receive a union —3— for detachably uniting the same, the said casing being formed with the usual externally threaded rear end portion —4— for connecting it to a service- or supply-pipe in the well known manner. Said union is formed with a nut —3$^\times$— intermediate its ends to provide external shoulders against which the head and casing abut as indicated at —3$^\times$—3$^\times$—.

—5— denotes the valve disposed within the casing —1— and shaped to fit a tapered seat —6— formed in the rear end of the union —3—. Said valve is of the form of a plug and is provided with a central longitudinal bore —7— for the reception of a stem —8— extending centrally through the union —3— and formed intermediate its ends with a collar —9— against which the valve abuts, and the rear end of the stem is threaded for the reception of a nut —10— serving to detachably connect the valve and stem. To insure free passage of the water through the union, I provide the collar —9— with a series of grooves —11—11— extending lengthwise of the stem as more clearly shown in Fig. 3.

The forward end of the valve-stem —8— is provided with a head —12— fitted to the interior of the union —3— to slide longitudinally therein whereby the valve-stem is guided centrally within the casing and the seating of the valve positively insured. The head is obviously formed with openings for the passage of water. To provide these openings, I prefer to construct the head in the form of a spider confined within the union and consisting of a series of lugs extending radially from the stem as clearly shown in Fig. 2. The union is formed with an internal shoulder —13— preferably at the center of the length thereof, and between said shoulder and aforesaid head —12— is provided a spiral spring —14— serving to close the valve —5—. Said shoulder is formed by reducing the internal diameter of the rear end portion of the union as clearly shown in Fig. 1. The said spider is formed with a central stud —15— projecting from the union and serving as a bearing for a cam —16— detachably secured, by means of a transverse pin —17—, to the lower or inner end of a rotatable spindle —18— extending centrally through the chamber —2$^{\times\times}$— and provided with suitable journal-bearings —19—19— at opposite ends of said chamber, the upper end of which spindle is provided with the usual operating-handle —20— preferably formed integral therewith. Said spindle is sustained against endwise movement by shoulders —21—22— on the cam and handle respectively. The cam —16— is preferably of the form of a collar disposed eccentric in relation to the spindle —18— whereby a uniform movement is imparted to the valve-stem in the operation of opening the valve. It will be understood that said cam is normally set to present to the valve stem the peripheral point defined by its shortest radius, whereby the spiral spring is allowed to exert forward or outward pressure on the head —12— with sufficient degree to retain the valve —5— closed. It will be evident that when the spindle is turned, the uniformly increasing radii of the cam will cause the valve to be correspondingly opened.

The chamber —$2^{xx}$— on the faucet-head is formed with a diaphragm —23— having a central opening —24— to which the spindle is closely fitted. This diaphragm divides the chamber into an upper compartment and a lower compartment, which latter communicates with a duct —25— leading to the discharge-nozzle —$2^x$—. By providing the chamber with the diaphragm, and providing the nozzle with the duct —25—, any water passing through the lower spindle-bearing —19— will escape through the nozzle and thus leakage at the top of the chamber will be effectually prevented.

By the described formation of the faucet-head it will be seen that the use of a stuffing-box or other packing is dispensed with.

One of the essential features of my improved faucet resides in the simplicity of construction, and the adaptability of the body members to be quickly and conveniently disconnected for the purpose of removing the internal parts when required for repairs or renewal.

What I claim as my invention is:

1. In a faucet, the combination of a hollow-body provided with a discharge-nozzle, a tubular member secured removably in the water-passage and formed with an internal shoulder and provided in its rear end with a valve-seat, a valve provided with a detachable stem extending axially through the tubular member, means on the stem fitted to the said member for guiding the stem, a spiral-spring disposed between said guide-means and aforesaid shoulder for forcing the stem in one direction to close the valve, a rotatable spindle journaled in the body and disposed at right angles to the valve-stem and at the forward end thereof, a cam secured to the spindle for actuating the stem in opposition to the spring to open the valve, and means for turning said spindle as set forth.

2. In a faucet, the combination of a hollow-body comprising an inlet-casing and a head provided with a discharge-nozzle, a union detachably uniting said parts, and forming a portion of the water-passage, said union being provided in its rear end with a valve-seat, and formed intermediate its ends with an internal peripheral shoulder, a valve having a detachable stem extending axially through the union, and guided therein, a spiral-spring disposed within the union and having one end bearing on the shoulder thereof and the other end engaging the stem for moving the valve to its closed position, means in the head for actuating the stem in opposition to the spring to open the valve, and an operating-handle for said stem-actuating means as set forth.

3. In a faucet, the combination of a hollow-body comprising a head provided with a discharge-nozzle, and an inlet-casing, a union detachably uniting said parts and forming a portion of the water-passage, said union being provided in its rear end with a tapered valve-seat, a valve having a detachable stem extending axially through the union, the stem formed intermediate of its ends with a collar against which the valve abuts, and formed at its forward end with a spider confined within the union, a stud formed in the center of the spider and projecting from the union, a spiral-spring seated within the union and bearing on the spider to force the stem forward for closing the valve, a rotatable spindle journaled in the head at right angles to the valve-stem and provided with an operating-handle, and a cam secured to said spindle and bearing against the aforesaid stud for actuating the valve-stem in opposition to the spring to open the valve as set forth.

4. The herein described faucet comprising a hollow-head provided with a downwardly extending discharge-nozzle, an upwardly extending chamber formed on the head and disposed above the water-passage and provided at its top and bottom with bearings for the spindle of the valve-actuating mechanism, and a diaphragm intermediate the bearings to divide the chamber into upper and lower compartments, and a duct formed in said head to afford communication between the lower compartment of the chamber and discharge-nozzle for the purpose set forth.

JOHN B. WOODWORTH.

Witnesses:
J. J. LAASS,
S. KAISER.